(12) United States Patent
Keshavarz et al.

(10) Patent No.: US 8,852,777 B2
(45) Date of Patent: Oct. 7, 2014

(54) METHODS FOR THE PREPARATION AND PURIFICATION OF ELECTROLYTES FOR REDOX FLOW BATTERIES

(75) Inventors: Majid Keshavarz, Pleasanton, CA (US); Aravamuthan Varadarajan, Fremont, CA (US)

(73) Assignee: Deeya Energy, Inc., Fremont, CA (US)

(*) Notice: Subject to any disclaimer, the term of this patent is extended or adjusted under 35 U.S.C. 154(b) by 887 days.

(21) Appl. No.: 12/631,749

(22) Filed: Dec. 4, 2009

(65) Prior Publication Data
US 2010/0143781 A1     Jun. 10, 2010

Related U.S. Application Data

(60) Provisional application No. 61/200,960, filed on Dec. 5, 2008.

(51) Int. Cl.
| | |
|---|---|
| H01M 4/36 | (2006.01) |
| H01M 4/48 | (2010.01) |
| H01M 6/20 | (2006.01) |
| H01M 8/18 | (2006.01) |
| H01M 8/20 | (2006.01) |
| C22B 11/10 | (2006.01) |
| C22B 34/32 | (2006.01) |
| C22B 3/44 | (2006.01) |

(52) U.S. Cl.
CPC .......... H01M 8/188 (2013.01); *C22B 11/10* (2013.01); *C22B 34/32* (2013.01); *C22B 3/44* (2013.01); H01M 8/20 (2013.01); *Y02E 60/528* (2013.01); *H01M 2300/0002* (2013.01)
USPC .......... 429/107; 429/108; 429/188; 429/344; 429/202; 75/392; 75/739; 75/740; 75/741

(58) Field of Classification Search
CPC .......... C22B 11/10; C22B 34/32; C22B 3/44; H01M 2300/0002; H01M 8/188; H01M 8/20; Y02E 60/528
USPC .......... 75/739, 740, 392; 429/188, 189, 105, 429/107; 423/101, 109, 138, 140, 493
IPC .......... C22B 23/00,3/00, 3/20, 3/22; H01M 8/20
See application file for complete search history.

(56) References Cited

U.S. PATENT DOCUMENTS

| | | | |
|---|---|---|---|
| 3,607,407 | A | 9/1971 | Adams |
| 3,899,404 | A | 8/1975 | Iverson |

(Continued)

FOREIGN PATENT DOCUMENTS

| | | | |
|---|---|---|---|
| JP | 52-155123 | * | 12/1977 |
| JP | 52-155123 A | * | 12/1977 |

OTHER PUBLICATIONS

PCT International Search Report and mailed Feb. 4, 2010, in related Inernational Application No. PCT/US2009/066888.

*Primary Examiner* — Basia Ridley
*Assistant Examiner* — Heng Chan
(74) *Attorney, Agent, or Firm* — Haynes and Boone, LLP

(57) ABSTRACT

A method for preparing a redox flow battery electrolyte is provided. In some embodiments, the method includes the processing of raw materials containing sources of chromium ions and/or iron ions. The method further comprises the removal of impurities such as metal ions from those raw materials. In some embodiments, a reductant may be used to remove metal impurities from an aqueous electrolyte containing chromium ions and/or nickel ions. In some embodiments, the reductant is an amalgam. In some embodiments, the reductant is a zinc amalgam. Also provided is a method for removing ionic impurities from an aqueous acid solution. Further provided a redox flow battery comprising at least one electrolyte prepared from the above-identified methods.

16 Claims, 2 Drawing Sheets

(56) References Cited

U.S. PATENT DOCUMENTS

| | | | |
|---|---|---|---|
| 4,111,688 A | 9/1978 | Ichijo | |
| 4,308,324 A | 12/1981 | Newman | |
| 4,362,791 A * | 12/1982 | Kaneko et al. | 429/101 |
| 4,579,791 A * | 4/1986 | Wang | 429/50 |
| 4,874,483 A | 10/1989 | Wakabayashi et al. | |
| 5,009,868 A | 4/1991 | Spitz et al. | |
| 5,324,341 A | 6/1994 | Nagel et al. | |
| 5,403,675 A | 4/1995 | Ogata et al. | |
| 6,077,622 A | 6/2000 | Minohara | |

* cited by examiner

US 8,852,777 B2

METHODS FOR THE PREPARATION AND PURIFICATION OF ELECTROLYTES FOR REDOX FLOW BATTERIES

RELATED APPLICATIONS

The present application claims priority to U.S. Provisional Application Ser. No. 61/200,960, filed on Dec. 5, 2008, by the same inventors and assigned to the same assignee, which is herein incorporated by reference in its entirety.

BACKGROUND

1. Technical Field

The present disclosure relates to methods for preparing and purifying electrolytes and electrolyte solutions useful in reduction-oxidation (redox) flow batteries.

2. Discussion

There is an increasing demand for novel and innovative electric power storage systems. Redox batteries have become an attractive means for such energy storage. In certain applications, a redox flow battery or a redox flow cell may include positive and negative electrodes disposed in separate half-cell compartments. The two half-cells may be separated by a porous or ion-selective membrane, through which ions are transferred during a redox reaction. Electrolytes (anolyte and catholyte) are flowed through the half-cells as the redox reaction occurs, often with an external pumping system. In this manner, the membrane in a flow cell battery operates in an aqueous electrolyte environment. In some applications, an iron-ion containing aqueous hydrochloric acid solution may be used as the catholyte, while a chromium-ion containing aqueous hydrochloric acid solution may be used as the anolyte. In some applications, a mixture of chromium and iron containing solutions may be used on both sides of the redox cell. The use of mixed reactants eliminates the requirement for a highly-selective membrane since the composition of both half cells is identical in the discharged state.

In some redox flow batteries, certain metal impurities contained in the electrolyte solution can cause side reactions at the negative electrode, which can result in the evolution of hydrogen gas that adversely affects the coulombic efficiency of the battery. While the use of high-purity raw materials such as high-grade iron chloride and high-grade chromium chloride can suppress such hydrogen gas-forming reactions, such materials are typically too expensive for use in redox batteries on a commercial scale.

Previously reported method of purification of electrolyte solution involves the preferential plating of nickel metal on an electrode of a flow battery utilizing lead to provide the hydrogen overpotential and aid the process. See Wakabayashi, A.; Umehara, Y.; Morie, S.; Kuwahara, "Process for the Preparation of Redox Battery Electrolyte and Recovery of Lead Chloride," U.S. Pat. No. 4,875,483. However, considerable hydrogen production is obtained and the nickel plating process does not go to conclusion, resulting in a remaining high level of impurities in the electrolyte.

Therefore, there exists a need to develop methods for preparing and purifying electrolyte solutions from inexpensive raw materials. In addition, there exists a need to develop methods of removing impurities from those electrolyte solutions, and, in particular, those impurities associated with the evolution of hydrogen gas and decreased efficiency of the flow battery.

SUMMARY

Consistent with some of the embodiments described herein, a method for preparing a redox flow battery electrolyte is provided. In some embodiments, the method comprises the processing of raw materials containing sources of chromium ions and/or iron ions. In some embodiments, those raw materials will contain impurities. In some embodiments, the raw materials contain impurities such as sources of certain transition-metal ions. In some embodiments, the method comprises the removal of impurities from those raw materials.

Consistent with some embodiments, the methods described herein include dissolving a raw material containing sources of certain ionic impurities in an acidic solution. In some embodiments, the aqueous solution containing ionic impurities is treated with a reductant. In some embodiments, the reductant is an amalgam.

Consistent with some embodiments, the methods describe herein allow for the removal of certain ionic impurities by effecting the precipitation of those impurities from solution in their elemental form or as an alloy with other impurities. In some embodiments, the methods describe herein allow for the removal of certain ionic impurities by effecting the deposition of those impurities on the surface of an amalgamated reductant. In some embodiments, the reducant is an amalgam. In some embodiments, the reducant is a zinc amalgam. In some embodiments, the excess reductant and impurities can be filtered off, resulting in a redox electrolyte solution containing chromium ions and/or iron ions that is substantially free of impurities.

Further embodiments and aspects of the invention are discussed with respect to the following figures, which are incorporated in and constitute a part of this specification.

DETAILED DESCRIPTION

Figure 1:
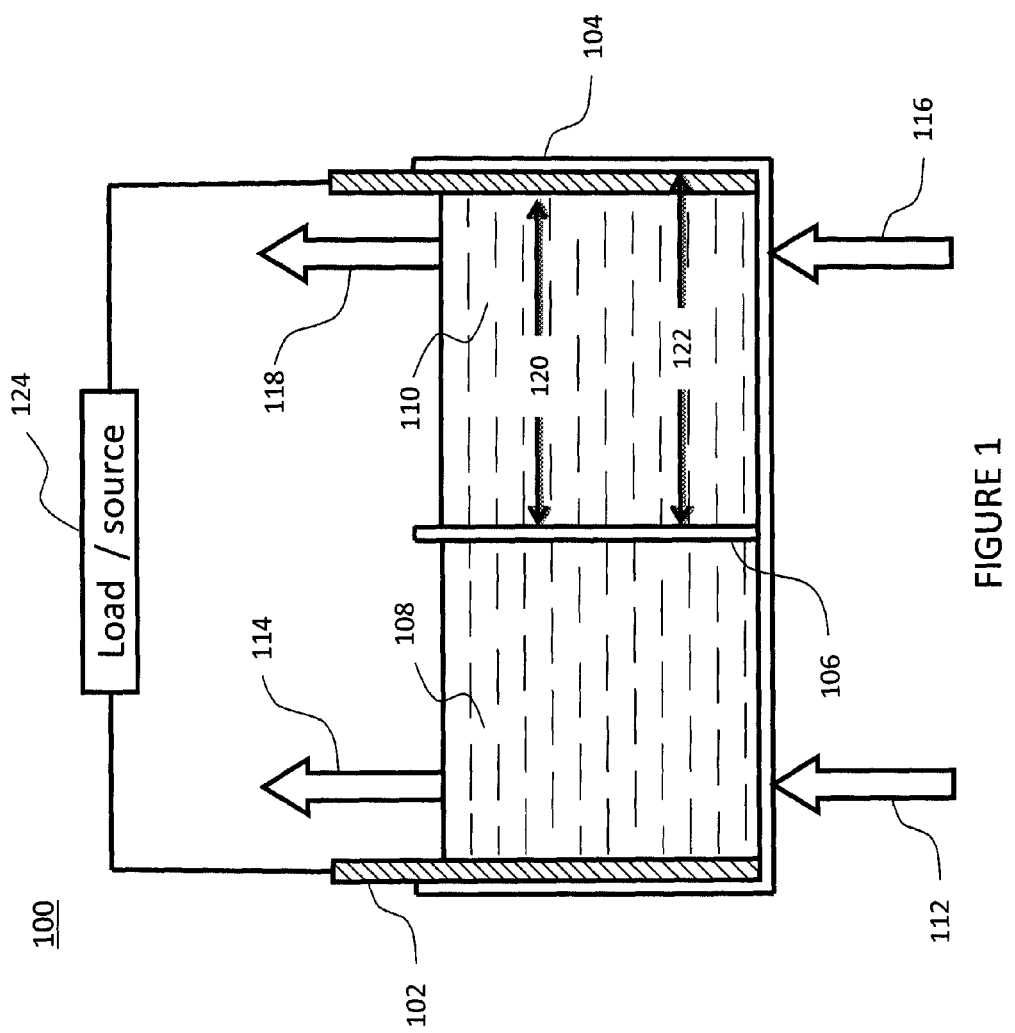
FIG. 1 illustrates a redox flow cell filled with electrolyte solution consistent with the embodiments described herein.

Low-cost raw materials containing sources of chromium ions and/or iron ions are desirable in that they can be processed for use as redox battery electrolytes. Exemplary raw materials include chrome ores, partially reduced chrome ores, ferrochrome ores ($Fe_aCr_bSi_cC_dX_e$, wherein X denote impurities, and a-e each independently represent the % composition of the ore, which may differ depending on the ore's source), chromium metal, and iron metal. Those raw materials may also contain impurities, such as sources of certain metal species. The removal of impurities may be desirable, as the presence of such impurities in redox electrolytes can result in unwanted side reactions in batteries and cells. For example, deposits of impurities may form at the cathode of a redox flow battery that utilizes an electrolyte containing certain ionic species. Impurities having low hydrogen overpotential can serve to induce hydrogen gas generation, thus lowering the coulombic efficiency and causing an electrochemical imbalance of the redox reactants in the battery. Accordingly, a principal aspect of the methods described herein is to provide an aqueous redox electrolyte substantially free of certain metal impurities.

As used in the present specification, the following words and phrases are generally intended to have the meanings as set forth below, except to the extent that the context in which they are used indicates otherwise.

As described herein, the term "amalgam" refers specifically to a metal amalgamated with mercury or a mercury alloy.

As described herein, the term "reductant" refers to a reducing agent having strong reducing properties with a high overpotential for hydrogen reduction in aqueous acidic solutions. An example of high hydrogen overpotential would include reducing agents that exhibit little to no evolution of hydrogen gas in an aqueous acidic solution. Suitable reductants exhibit little or no interference (in their oxidized form) with the electrochemical process of the resulting electrolyte.

As described herein, the term "impurities" refers to those materials that deposit under reductive conditions and having low hydrogen overpotential. An example of low hydrogen overpotential would include materials that evolve hydrogen gas in an aqueous acidic environment.

In one principal aspect of the methods described herein, a raw material is dissolved/extracted in aqueous acid to form a solution containing chromium ions and/or iron ions. In certain embodiments, hydrochloric acid (HCl) may be used. In some embodiments, HCl may be partially or completely replaced with other Brontsted acids such as, for example, hydrobromic acid, hydroiodic acid, sulfuric acid, sulfonic acid, phosphoric acid, phosphonic acid, perchloric acid, carboxylic acids (e.g., acetic acid, citric acid, etc.), and mixtures thereof. In certain embodiments, a mixture of hydrochloric acid (HCl) and sulfuric acid may be used. In certain embodiments, a mixture of hydrochloric acid (HCl) and hydrobromic acid may be used. In some instances, the raw material may further contain sources of certain impurities. Such impurities may include, but are not limited to, metal ions such as antimony, bismuth, cadmium, cobalt, copper, lead, manganese, molybdenum, niobium, nickel, ruthenium, titanium, tungsten and zinc. In some instances, the raw material may contain sources of nickel ions, cobalt ions and/or sources of copper ions. In some embodiments, the raw material is a ferrochrome alloy. In some embodiments, the raw material is a chromium metal. In some embodiments, the raw material is iron metal. In some embodiments, the raw material is a mixture of ferrochrome alloy and iron metal. In some instances, the solution may contain from about 1 to about 5,000 ppm of nickel ions. In some instances, the solution may contain from about 50 to about 500 ppm of nickel ions. In some instances, the solution may contain from about 1 to about 1,000 ppm of cobalt ions. In some instances, the solution may contain from about 10 to about 50 ppm of cobalt ions. In some instances, the solution may contain from about 1 to about 1000 ppm of copper ions. In some instances, the solution may contain from about 10 to about 20 ppm of copper ions.

In certain circumstances, complete extraction of the raw material may require grinding, pulverizing, stirring, and/or heating. In some instances, additional sources of preferred ions may be added to achieve the desired stoichiometric balance of ionic species. For example, iron ($Fe^0$) powder may be mixed with the ground raw material prior to addition to the aqueous HCl solution to achieve the desired concentration of iron ions. The concentrations of the desired ions can be determined using known techniques such as ultraviolet-visible spectrophotometry, while the concentration of impurities can be determined using atomic absorption spectrometry and inductively-coupled plasma mass spectrometry (ICP-MS).

Upon dissolution, any undissolved solids such as carbon and silica may be removed, for example, by filtration. Suitable filtration methods include the use of solid filters having a mesh suitable for removing undissolved solids. However, in some instances, filtration may not be necessary. Subsequent to filtration, the resulting solution is placed under an inert atmosphere. Suitable inert atmospheric conditions include anaerobic environments under nitrogen ($N_2$) and/or argon (Ar). Under those inert conditions, the filtered solution is then subjected to at least one reductant. Suitable reductants for processing ferrochrome raw materials include, for example, those that exhibit little interference (in their oxidized form) with the Cr/Fe electrochemical process. Preferred reductants should also be cost effective. In some embodiments, a suitable reductant may be an amalgam. In some embodiments, the reductant may be a lead amalgam, chromium amalgam, zinc amalgam, or any other suitable amalgam, or mixtures thereof. In some embodiments, a suitable reductant may be a zinc amalgam. In some embodiments, a suitable reductant may be a zinc alloy amalgam. The reductant can take different forms, such as, for example, an amalgamated zinc powder or amalgamated zinc particles. In some embodiments, the reductant comprises zinc amalgam particles. In some embodiments, the zinc amalgam particles may be formed by amalgamating zinc powder or a zinc alloy powder with mercury. In some embodiments, the reductant can be accompanied by small amount of catalyst such as lead ions. In some embodiments, the zinc amalgam particles may be formed by adding zinc powder to an aqueous solution of $HgCl_2$ and HCl. In some embodiments, the zinc powder or zinc alloy powder may be amalgamated in $HgCl_2$ solutions containing about 1 wt % to about 20 wt % mercury. In some embodiments, the reduction can be accomplished electrochemically by subjecting the impure solution to cathodic reduction using an amalgamated electrode.

Upon reduction of the raw material solution, chromium (III) ions will under go reduction to chromium (II) ions and impurities such as copper, silver, tungsten, tin, lead, indium, molybdenum, vanadium, nickel, cobalt, thallium, cadmium and noble metals will undergo reduction to their elemental form and precipitate out of solution. The most common impurities in ferrochrome samples include nickel, cobalt and copper. In some instances, the precipitation of the impurities out of solution may be effected or aided by the deposition of the impurity on the surface of the reductant. In some instances, stirring or agitation of the solution may be necessary to achieve optimal precipitation. In some instances, impurities such as nickel ions, cobalt ions, and copper ions will precipitate out of solution in their elemental form, as exemplified by the following:

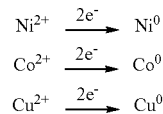

In some instances, impurities such as nickel, cobalt and copper ions will precipitate out of solution in the form of an alloy and/or an amalgam, The removal of impurities such as nickel ions from solution will effectively reduce the formation of nickel deposits at the cathode, and thus eliminate the undesired side reactions such as the generation of hydrogen gas. In some embodiments, the amount of nickel ions may be reduced to about 10 ppm or less. In some embodiments, the amount of nickel ions may be reduced to about 1 ppm or less. In some embodiments, the amount of nickel ions may be reduced to about 10 ppb or less. In some embodiments, the amount of cobalt and copper ions may be reduced to about 10 ppm or less. In some embodiments, the amount of cobalt and copper ions may be reduced to about 10 ppb or less.

Once the desired concentration of impurities is removed from solution, mercury metal and any precipitated impurities are removed from the solution. This may be achieved by filtration while the solution remains under an inert (e.g., $N_2$) atmosphere. Suitable filtration methods may include the use of a solid filter, such as filter paper or Fritted discs, and a filter aid such as Celite®, Celpure® or Celatom®. In some embodiments, the ferrochrome extraction/dissolution and reduction steps can be undertaken in one pot. For instance, any undissolved solids from the extraction/dissolution step may be kept in solution through the reduction of the raw material. Thereafter, those undissolved solids may be filtered off during the removal of any impurities that have precipitated out of solution.

Once filtered, concentrated HCl or HCl gas may be added to solution to achieve the desired acid concentration. In some methods using a zinc amalgam, the filtration methods described will effectively remove the excess amalgam and liquid mercury from the solution. Zinc from the reductant may remain in solution as zinc chloride without adversely affecting the physical or electrochemical properties of the resulting electrolyte solution. In some instances, the filtered mercury may be recovered for reuse. This may be achieved by dissolving any elemental nickel and/or other impurities that may have deposited on the reductant in an oxidizing solution to obtain a solution containing nickel ions and/or other ionic impurities. For example, recovered amalgam particles may be treated with a dilute acid such as hydrochloric acid or dilute nitric acid to effectively dissolve the elemental nickel, cobalt and/or copper from those particles. After filtration, the solution may be removed from the inert atmospheric conditions and exposed to aerobic conditions. In some embodiments, aerobic conditions are used to effect oxidation of certain ionic species in solution. In some embodiments, oxidizing agents like hypochlorites or stoichiometric amount of chlorine or ferric chloride can be used to effect oxidation of certain ionic species in solution For example, bubbling air or pure oxygen though the filtered solution containing chromium ions may result in the following reaction:

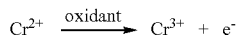

$$Cr^{2+} \xrightarrow{\text{oxidant}} Cr^{3+} + e^-$$

Once the desired ionic species are formed, the desired electrolytic can be formulated for use as a redox battery electrolyte by adding the appropriate amount of catalysts and additives. In some embodiments, the reducing agent may be produced by using aqueous solution containing HCl and $HgCl_2$. Zinc powder may then be added to the aqueous solution under stirring, resulting in the formation of zinc amalgam particles. Other non-limiting examples of suitable zinc sources include zinc dust, zinc mossy, zinc granules, zinc nanosized activated powder, or zinc foil FIG. 1 illustrates a redox flow cell 100 filled with electrolyte solution consistent with embodiments described. Redox flow cell 100 includes two half-cells 108 and 110 separated by permeable membrane 106. Half-cells 108 and 110 include electrodes 102 and 104 respectively, in contact with an electrolyte such that an anodic reaction occurs as the surface of one of electrodes 102 or 104 and a cathodic reaction occurs at the surface of the other one of electrodes 102 or 104. In some embodiments, multiple redox flow cells 100 can be electrically coupled (e.g., stacked) either in series to achieve higher voltage or in parallel in order to achieve higher current. When filled with electrolyte, one half-cell (e.g., 108 or 110) of redox flow cell 100 contains an anolyte and the other half-cell contains a catholyte, the anolyte and catholyte being collectively referred to as electrolytes. Reactant electrolytes may be stored in separate tanks and dispensed into the cells 108 and 110 via pipes coupled to cell input/output (I/O) ports 112, 114 and 116, 118 respectively, often using an external pumping system.

At least one electrode 102 and 104 in each half-cell 108 and 110 provides a surface on which the redox reaction takes place and from which charge is transferred. Redox flow cell 100 operates by changing the oxidation state of its constituents during charging or discharging. The two half-cells 108 and 110 are connected in series by the conductive electrolytes, one for anodic reaction and the other for cathodic reaction. In operation (i.e., charge or discharge), electrolyte (i.e., anolyte or catholyte) is flowed through half-cells 108 and 110 through I/O ports 112, 114 and 116, 118 respectively as the redox reaction takes place. Positive ions or negative ions pass through permeable membrane 106 separating the two half-cells 108 and 110 as the redox flow cell 100 charges or discharges. Reactant electrolytes are flowed through half-cells 108 and 110, as necessary, in a controlled manner to supply electrical power or be charged by load/source 120.

Figure 2:
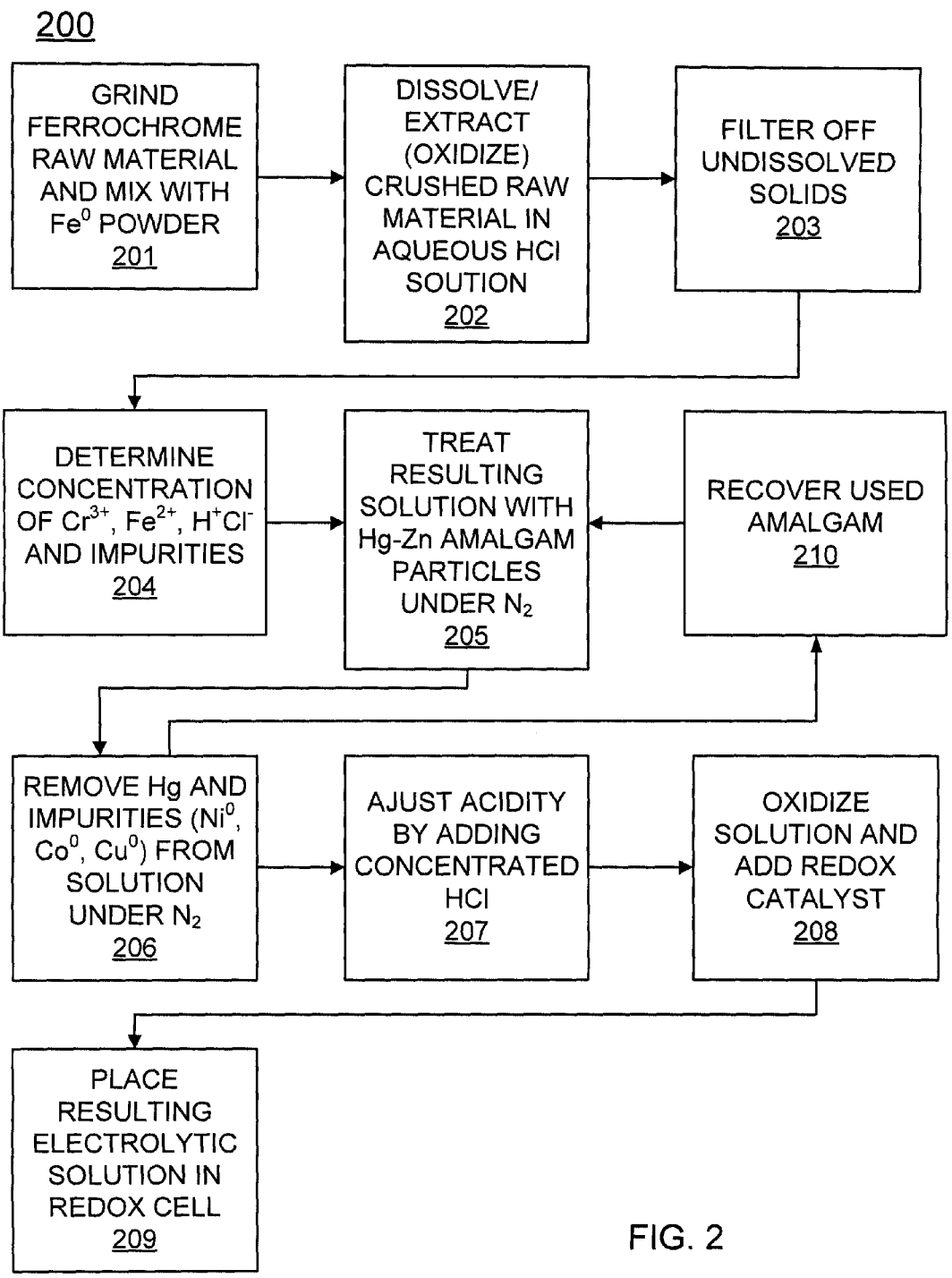
FIG. 2 illustrates a flow chart representing the steps of a method for preparing a redox electrolyte that is consistent with the embodiments described herein.

FIG. 2 illustrates an electrolyte production flow chart 200 consistent with the embodiments disclosed herein. At step 201, a ferrochrome raw material is pulverized and ground to increase the overall surface area of the material, and then mixed with $Fe^0$ powder to attain stoichiometrically-balanced electrolyte. Following pulverization, at step 202, the crushed raw material is extracted/dissolved in an aqueous hydrochloric acid solution, wherein the ferrochrome alloy oxidizes to Fe (II) and Cr (III) ions with concomitant evolution of hydrogen gas. At step 203, any undissolved solids, such as carbon and silica, may be removed by filtration, resulting in a hydrochloric acid solution containing iron (II) ions, chromium (III) ions, and impurities such as nickel (II) ions, cobalt (II) ions, and copper (II) ions. In step 204, the concentration of $Cr^{3+}$, $Fe^{2+}$, and the various impurities is determined, for example, by ultraviolet-visible absorption and inductively coupled plasma mass spectrometry (ICP-MS). In step 205, the resulting solution is treated with a zinc amalgam reductant under an inert $N_2$ atmosphere. In step 206, the elemental mercury from the reductant and any elemental impurities are filtered off the solution under $N_2$. In some embodiments, a step 210 may be added to recover the used amalgam so that it can be utilized again in step 205. In step 207, the desired acidity can be achieved by adding HCl to the solution. The solution may than be removed from the inert atmosphere in step 208, and oxidized by bubbling air through the solution. Additives and a redox catalyst may also be added to the final solution. At step 209, the resulting electrolyte solution may be used in a redox flow cell.

Additionally, the residue from the purification reaction can be reprocessed for recovering and reusing the mercury leading to waste minimization. In this process the mercury containing waste from the reduction reaction is removed. The waste contains mercury along with metal purities such as nickel, copper, iron etc. It is treated with a solution of 10% FeCl3 and 10% HCl to remove the metals other than mercury. The residual mercury is then dissolved in concentrated HNO3 and reprecipitated as the basic carbonate with saturated NaHCO3. The precipitate is then removed and redissolved in 12 M HCl to convert to the chloride which can be used again for the amalgam preparation.

In the examples below, the following abbreviations have the following meanings. If an abbreviation is not defined, it has its generally accepted meaning.

mL=milliliters
L=liters
° C.=degrees Celsius
M=molarity
N=normality
ppm=parts per million
ppb=parts per billion
$N_2$=nitrogen gas
cm=centimeters
$HNO_3$=nitric acid
$PbCl_2$=lead chloride
Co=cobalt
Cu=copper
Ni=nickel
Hg=mercury
$HgCl_2$=mercuric chloride
DI=deionized
g=gram
hr=hour
rt=room temperature Ferrochrome Extraction Procedure (Steps 201-204)

Example 1

A 1 L three-necked flask fitted with a reflux condenser, mechanical stirrer and a Teflon-coated thermocouple was charged with 8M HCl (650 mL). The reflux condenser was connected through a gas outlet adapter to a gas measuring burette filled with water from a reservoir. Ground ferrochrome (54.1 g, 60 mesh) and iron powder (28.1 g, 325 mesh) were premixed. The mixture was added to the acid in small quantities (approx. 1.4 g) with constant stirring at rt. The hydrogen gas released was measured at each addition. The maximum reaction temperature reached was about 25° C. and the total amount of hydrogen evolved was approximately 32 L.

After the completion of addition (about 67 h), the reaction mixture was stirred for 22 h at rt and then filtered through a medium frit funnel using a water aspirator. The green filtrate (615 mL, 795.5 g) was analyzed by UV-VIS spectrophotometry for Cr(III) and Fe(II) concentrations, which were found to be 1.24 M ($\lambda$max 616 nm) and 1.32 M ($\lambda$max 970 nm), respectively. The concentrations of other impurities were measured by ICP-MS. The residue in the funnel was washed with water and methanol respectively, dried in air under suction and collected (1.19 g).

Example 2

A 5 L three-necked flask fitted with a reflux condenser, mechanical stirrer and a Teflon coated thermocouple was charged with 8M HCl (3000 mL). The reflux condenser was connected through a gas outlet adapter to a long piece of Tygon tubing to release the hydrogen gas into the fume hood exhaust. Ground ferrochrome (250.09 g, 35-60 mesh) and iron powder (129.46 g, 325 mesh) were premixed. The mixture was added to the acid in small quantities with constant stirring at ambient temperature. The maximum reaction temperature reached was about 31° C.

After the completion of addition, which took approximately 125 h, the reaction mixture was stirred for 13 h at ambient temperature and then filtered through a medium frit funnel using a water aspirator. The green filtrate (2818 mL, 3868.7 g) was analyzed by UV-VIS spectrophotometry for Cr(III) and Fe(II) concentrations which were found to be 1.221 M ($\lambda$max 615 nm) and 1.349 M ($\lambda$max 970 nm) respectively. The HCl concentration was measured to be 2.688 M. The concentrations of other impurities were measured by ICP-MS. The residue in the funnel was washed with water and methanol respectively, dried in air under suction and collected (3.74 g).

Example 3

A 1 L three-necked flask fitted with a reflux condenser, mechanical stirrer and a Teflon coated thermocouple was charged with 9M HCl (1000 mL). The reflux condenser was connected through a gas outlet adapter to a long piece of Tygon tubing to release the hydrogen gas into the fume hood exhaust. Ground ferrochrome (54.1 g, 250 mesh) and iron powder (69 g, 325 mesh) were premixed. The mixture was added to the acid in small quantities with constant stirring at ambient temperature. The maximum reaction temperature reached was about 38° C.

After the completion of addition, which took approximately 25 h, the reaction mixture was stirred for 7 h at ambient temperature and then filtered through a medium frit funnel using a water aspirator. The green filtrate (900 mL, 1226.2 g) was analyzed by UV-VIS spectrophotometry for Cr(III) and Fe(II) concentrations which were found to be 1.46 M ($\lambda$max 627 nm) and 1.82 M ($\lambda$max 970 nm) respectively. The HCl concentration was measured to be 3.2 M. The concentrations of other impurities were measured by ICP-MS. The residue in the funnel was washed with water and methanol respectively, dried in air under suction, and collected (1.88 g).

Due to the high concentration, the salts tend to crystallize on standing at ambient temperature. The solution is then warmed (at 40° C.) in order to dissolve the solids prior to further use.

Example 4

A 1 L three-necked flask fitted with a reflux condenser, mechanical stirrer and a Teflon coated thermocouple was charged with 8M HCl (1000 mL). The reflux condenser was connected through a gas outlet adapter to a long piece of Tygon tubing to release the hydrogen gas into the fume hood exhaust. Ground ferrochrome (54.1 g, 250 mesh) was added to the acid in small quantities with constant stirring at ambient temperature. The maximum reaction temperature reached was about 36° C.

After the completion of addition, which took approximately 4.5 h, the reaction mixture was stirred for 3.5 h at ambient temperature and then filtered through a medium frit funnel using a water aspirator. The green filtrate (620 mL, 763.2 g) was analyzed by UV-VIS spectrophotometry for Cr(III) and Fe(II) concentrations which were found to be 1.13 M ($\lambda$max 627 nm) and 0.43 M ($\lambda$max 970 nm) respectively. The HCl concentration was measured to be 4.27 M by titration. The concentrations of other impurities were measured by ICP-MS. The residue in the funnel was washed with water and methanol respectively, dried in air under suction and collected (1.17 g).

Purification of Ferrochrome Extract (Steps 205-206)

Example 5

A solution of ferrochrome extract (100 mL, 1.19 M Cr(III), 1.38 M Fe(II) in 2.67 M HCl) was degassed by slowly bubbling $N_2$ for a few minutes. To this solution was added zinc amalgam (12.25 g) in small quantities under $N_2$ over 185 min. After the addition was complete, the mixture was stirred for 2 h. An aliquot (approx. 0.1 mL) was withdrawn every half hour and filtered through 0.2 micron filter. 0.05 mL of the filtrate was diluted 200 times with a solution of 1% $HNO_3$ and 0.5% HCl and analyzed by ICP-MS for nickel content. The nickel content dropped from an initial value of 260 ppm to 0.91 ppm over this period. The bulk of the solution was filtered under a blanket of $N_2$ through a 2 cm bed of Celatom® FW-80 in a funnel with medium frit. The filtrate was treated with degassed 12 N HCl (15 mL) The solution was then exposed and air was bubbled in for 1.5 h. The solution was 0.91 M in Cr(III) and 0.88 M in Fe(II) as shown by UV-VIS analysis and 1.94 M in HCl as shown by pH titration. The values (ppm) for the concentration of other metals of significance are given below:

| Treatment | Co | Cu | Ni | Hg |
|---|---|---|---|---|
| Before (ppm) | 31 | 14 | 260 | 0.05 |
| After (ppm) | 7 | 0.00058 | 0.9 | 0.0065 |

The weight of the amalgam reported here is the wet weight, though most of the water was drained prior to weighing

Example 6

A solution of ferrochrome extract (100 mL, 1.19 M Cr (III), 1.38 M Fe (II) in 2.67 M HCl) was degassed by slowly bubbling $N_2$ for 10 min. To this solution was added zinc amalgam (10.38 g) in small quantities under nitrogen over 137 min. After the addition was complete, the mixture was stirred for 2 h. An aliquot (approx. 0.1 mL) was withdrawn every half hour and filtered through an 0.2 micron filter. 0.05 mL of the filtrate was diluted 200 times with a solution of 1% $HNO_3$ and 0.5% HCl and analyzed by ICP-MS for nickel content. The nickel content dropped from an initial value of 270 ppm to 2.5 ppm over this period. The bulk of the solution was filtered under a blanket of $N_2$ through a 2 cm bed of Celatom® FW-80 in a funnel with medium frit. The filtrate was treated with degassed 12 N HCl (12 mL). The solution was then exposed and air was bubbled in for 1 h. The solution was 0.98 M in Cr (III) and 0.99 M in Fe (II) as shown by UV-VIS analysis and 2.33 M in HCl as shown by pH titration. The values (ppm) for the concentration of other metals of significance are given below:

| Treatment | Co | Cu | Ni | Hg |
|---|---|---|---|---|
| Before (ppm) | 33 | 14 | 270 | 0.00062 |
| After (ppm) | 18 | 0.00057 | 2.5 | 0.21 |

Example 7

A solution of ferrochrome extract (100 mL, 1.44 M Cr (III), 1.74 M Fe (II) in 3.2 M HCl) was degassed by slowly bubbling $N_2$ for 10 min. To this solution was added zinc amalgam (14.85 g) in small quantities under nitrogen over 105 min. After the addition was complete, the mixture was stirred for 3 h. An aliquot (approx. 0.1 mL) was withdrawn every half hour and filtered through 0.2 micron filter. 0.05 mL of the filtrate was diluted 200 times with a solution of 1% $HNO_3$ and 0.5% HCl and analyzed by ICP-MS for nickel content. The nickel content dropped from an initial value of 290 ppm to 3.6 ppm over this period. The bulk of the solution was filtered under a blanket of N2 through a 2 cm bed of Celatom® FW-80 in a funnel with medium frit. The filtrate was treated with degassed 12 N HCl (24.3 mL). The solution was then exposed and air was bubbled in for 1 h. It was then kept under $N_2$ and heated at 40° C. overnight. The solution was 1.12 M in Cr (III) and 1.23 M in Fe (II) as shown by UV-VIS analysis and 2.66 M in HCl as shown by pH titration. The values (ppm) for the concentration of other metals of significance are given below:

| Treatment | Co | Cu | Ni | Hg |
|---|---|---|---|---|
| Before (ppm) | 36 | 15 | 290 | 0.0053 |
| After (ppm) | 14 | 0.00072 | 3.6 | 0.0031 |

Example 8

A 2 L three-necked flask fitted with a nitrogen inlet adapter, mechanical stirrer and a Teflon coated thermocouple was charged with a solution of ferrochrome extract (700 mL, 1.44 M Cr (III), 1.74 M Fe (II) in 3.2 M HCl) which was degassed by slowly bubbling $N_2$ for 15 min. To this solution was added zinc amalgam prepared as above (104.01 g) in small quantities under nitrogen over 7.75 h. After the addition was complete, the mixture was stirred for 9.5 h. The bulk of the solution was filtered under a blanket of N2 through a 4 cm bed of Celatom® FW-80 in a funnel with medium frit. 0.05 mL of the filtrate was diluted 200 times with a solution of 1% $HNO_3$ and 0.5% HCl and analyzed by ICP-MS for nickel content. The nickel content dropped from an initial value of 300 ppm to 0.052 ppm over this period. The filtrate was treated with degassed 12 N HCl (208 mL). The solution was then exposed and air was bubbled in for 4 h. The solution was 1.04 M in Cr (III) and 1.02 M in Fe (II) as shown by UV-VIS analysis and 2.42 M in HCl as shown by pH titration. The values (ppm) for the concentration of other metals of significance are given below:

| Treatment | Co | Cu | Ni | Hg |
|---|---|---|---|---|
| Before (ppm) | 36 | 15 | 300 | 0.013 |
| After (ppm) | 2.4 | 0.00061 | 0.052 | 0.041 |

Example 9

A solution of ferrochrome extract (100 mL, 1.19 M Cr(III), 1.36 M Fe(II) in 2.67 M HCl) was treated with $PbCl_2$ (2.9 mg, 0.01 mmol) and was degassed by slowly bubbling N2 for 10 min. To this solution was added zinc amalgam (14.85 g) in small quantities under nitrogen over 74 min. After the addition was complete, the mixture was stirred for 3 h. An aliquot (approx 0.1 mL) was withdrawn every half hour and filtered through an 0.2 micron filter. 0.05 mL of the filtrate was diluted 200 times with a solution of 1% HNO3 and 0.5% HCl and analyzed by ICP-MS for nickel content. The nickel content dropped from an initial value of 260 ppm to 0.19 ppm over this period. The bulk of the solution was filtered under a blanket of N2 through a 2 cm bed of Celatom® FW-80 in a funnel with medium frit. The filtrate was treated with degassed 12 N HCl (24.3 mL). The solution was then exposed and air was bubbled in for 1 h. It was then kept under N2 and heated at 40° C. overnight. The solution was 1.12 M in Cr (III) and 1.23 M in Fe (II) as shown by UV-VIS analysis and 2.66

M in HCl as shown by pH titration. The values (ppm) for the concentration of other metals of significance are given below:

| Treatment | Co | Cu | Ni | Hg | Pb |
|---|---|---|---|---|---|
| Before (ppm) | 32 | 14 | 260 | 0.0022 | 19 |
| After (ppm) | 3 | 0.0011 | 0.19 | 0.026 | 0 |

Recovery of Mercury from Used Amalgam (Step 210)

Example 10

A sample (40 mg) of the residue from Example 8 was carefully removed from the filter aid and treated with solution of 10% FeCl3 in 10% HCl (0.2 mL) at 30° C. for 1 h. The mixture was centrifuged, the residue washed with H2O (2.times.0.6 mL) and centrifuged again. It was then treated with concentrated HNO3 (15 N, 0.1 mL) to dissolve the mercury. The residue was neutralized carefully with saturated NaHCO3 (1.5 mL) to obtain an orange precipitate which was centrifuged and washed with water (1.5 mL). The residue was dissolved in concentrated HCl (12 M, 0.1 mL). ICPMS analysis of an aliquot after 100 times dilution showed the amount of mercury present in the bulk solution to be 16 mg. This solution can be reused for the preparation of zinc amalgam as outlined below.

Preparation of Zinc Amalgam (Steps 205 and 210)

Example 11

$HgCl_2$ (20 g) was dissolved in a solution of 10 mL of concentrated HCl in 300 mL of DI water. Zinc powder (100 g, 140-325 mesh) was added quickly with stirring. After stirring for 15 min, the amalgam was decanted and washed repeatedly with a total of 500 mL of water containing a trace of HCl. The amalgam was stored under DI water.

Analysis of the amalgam content was done as follows: a sample of the amalgam was removed from water and weighed (0.115 g) after draining water. Then the wet amalgam was repeatedly rinsed with acetone, dried carefully in a gentle stream of nitrogen in the fumehood and weighed (0.074 g) again. The difference in weight gave the weight of water. The water composition thus measured was 35.4% by weight. The dried sample was dissolved in 1 mL concentrated nitric acid and diluted to 100 mL with 0.12 M HCl. The sample was further diluted 20,000 times for ICPMS analysis to determine Zn and Hg composition which were 87.7% and 12.3% by weight respectively.

Example 12

Preparation on zinc amalgam: $HgCl_2$ (2.5 g) was dissolved in a solution of 2.5 mL of concentrated HCl in 50 mL of DI water. Zinc powder (50 g, 140-325 mesh) was added quickly with stirring. After stirring for 15 min, the amalgam was decanted and washed repeatedly with a total of 100 mL water containing a trace of HCl. The amalgam was stored under DI water.

Evaluation of Flow Cell Performance Using Purified Electrolyte (Step 209)

Example 13

A flow cell was constructed as shown in to FIG. 1. Ferrochrome solution purified by the zinc amalgam method and having the composition of 1.04 M CrCl3, 1.02 M FeCl2 and 2.42 M HCl containing 0.1 mM BiCl3 and 0.1 mM PbCl2 as catalysts was used as the electrolyte. Thermoset graphite foils in contact with carbon felts (29.2 mm thickness) were used as the electrodes. Daramic membrane (1 mm thickness) was used as the separator. The total volume of electrolyte in each compartment was roughly 150 mL. The charging current density was 40 mA/cm$^2$. Polarization measurement gave area resistivity values of 2.58 and 2.54 ohmcm$^2$ for charging and discharging respectively. Charge/discharge cycles were carried out within the state of charge limits of 20 and 80%. After 26 cycles, the coulombic, voltage and the power efficiencies were 95.3%, 81.45 and 77.5% respectively.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. It should be understood that various alternatives to the embodiments of the invention described herein may be employed in practicing the invention. The specification and drawings are accordingly to be regarded in an illustrative rather than restrictive sense. It is intended that the following claims define the scope of the invention and that methods and structures within the scope of these claims and their equivalents be covered thereby.

What is claimed is:

1. A method for preparing a redox battery electrolyte, comprising:
    dissolving a raw material in an aqueous liquid with at least one acid to form a solution that includes one or both of chromium ions and iron ions and further includes at least one ionic impurity;
    adding an amalgam reductant to the solution, thereby causing the at least one ionic impurity to precipitate out of the solution in its elemental form or as an alloy with at least one second impurity in filterable form;
    filtering the solution to remove the amalgam reductant and the at least one ionic impurity from the solution to purify the solution; and
    adjusting the acidity of the purified solution by adding further acid to form the redox battery electrolyte.

2. The method of claim 1, further comprising removing undissolved solids from the solution prior to adding the amalgam reductant to the solution.

3. The method of claim 1, wherein amalgam reductant is added to the solution under an inert atmosphere.

4. The method of claim 3, wherein filtering the amalgam reductant and the at least one elemental impurity from the solution is performed under an inert atmosphere.

5. The method of claim 4, wherein filtering the solution comprises using a solid filter and a filter aid.

6. The method of claim 4, further comprising oxidizing the filtered solution.

7. The method of claim 1, wherein the amalgam reductant is zinc amalgam.

8. The method of claim 7, wherein the amalgam reductant is a zinc alloy amalgam.

9. The method of claim 1, wherein the at least one impurity is selected from copper, silver, tungsten, tin, lead, indium, molybdenum, vanadium, nickel, cobalt, thallium, cadmium, ruthenium and noble metals.

10. The method of claim 1, wherein the at least one impurity is selected from nickel ions, cobalt ions, and copper ions.

11. The method of claim 1, wherein the at least one impurity is nickel ions.

12. The method of claim 11, wherein the purified solution includes an amount of nickel ions that is less than 5 parts per million.

13. The method of claim 1, wherein the raw material is selected from at least one of chrome ores, partially-reduced chrome ores, ferrochrome ores, iron metal and chromium metal.

14. The method of claim 1, wherein the at least one acid is selected from hydrochloric acid, hydrobromic acid, hydroiodic acid, sulfuric acid, sulfonic acid, phosphoric acid, phosphonic acid, perchloric acid, carboxylic acids, and mixtures thereof.

15. The method of claim 1, wherein the at least one acid is hydrochloric acid.

16. The method of claim 1, further comprising:
   collecting the amalgam reductant and ionic impurity from the solution; and
   reusing the collected amalgam reductant in subsequent steps of adding the amalgam reductant to the solution and causing the at least one ionic impurity to precipitate out of the solution in its elemental form or as an alloy with at least one second impurity in filterable form.

* * * * *